(12) United States Patent
Perozo et al.

(10) Patent No.: US 9,848,585 B1
(45) Date of Patent: Dec. 26, 2017

(54) BONE OR CHEW TOY HOLDER

(71) Applicants: Cesar Perozo, Stoneham, MA (US); Cara Perozo, Stoneham, MA (US)

(72) Inventors: Cesar Perozo, Stoneham, MA (US); Cara Perozo, Stoneham, MA (US)

(*) Notice: Subject to any disclaimer, the term of this patent is extended or adjusted under 35 U.S.C. 154(b) by 0 days.

(21) Appl. No.: 15/194,759

(22) Filed: Jun. 28, 2016

(51) Int. Cl.
*A01K 29/00* (2006.01)
*F16M 11/04* (2006.01)
*F16M 11/12* (2006.01)
*F16M 11/28* (2006.01)
*F16M 13/02* (2006.01)
*F16B 47/00* (2006.01)
*A01K 5/00* (2006.01)

(52) U.S. Cl.
CPC ............... *A01K 29/00* (2013.01); *A01K 5/00* (2013.01); *F16B 47/00* (2013.01); *F16M 11/041* (2013.01); *F16M 11/12* (2013.01); *F16M 11/28* (2013.01); *F16M 13/022* (2013.01); *F16M 2200/028* (2013.01); *F16M 2200/04* (2013.01)

(58) Field of Classification Search
CPC ......... A01K 15/025; A01K 29/00; A01K 5/00
USPC ......... 248/560; 119/707, 708, 709, 702, 705
See application file for complete search history.

(56) References Cited

U.S. PATENT DOCUMENTS

| | | | | |
|---|---|---|---|---|
| 5,339,770 A | * | 8/1994 | Haffner | A01K 15/025 119/708 |
| 5,924,387 A | * | 7/1999 | Schramer | A01K 15/025 119/708 |
| 6,076,486 A | | 6/2000 | Oliano | |
| D542,506 S | | 5/2007 | Springer | |
| D555,300 S | * | 11/2007 | Tsengas | D30/160 |
| 8,087,387 B2 | | 1/2012 | Gamble | |
| D657,924 S | * | 4/2012 | Soegaard | D30/160 |
| 8,371,249 B1 | * | 2/2013 | Little | A01K 15/025 119/707 |
| 2003/0172879 A1 | * | 9/2003 | Bader | A01K 5/0114 119/709 |
| 2003/0205206 A1 | | 11/2003 | Natale | |
| 2004/0069922 A1 | * | 4/2004 | Wu | E04H 12/2246 248/519 |
| 2005/0039696 A1 | | 2/2005 | Springer | |
| 2005/0178300 A1 | * | 8/2005 | Garfunkle | A47B 13/023 108/150 |
| 2006/0231722 A1 | * | 10/2006 | Ma | E04H 12/2246 248/523 |
| 2010/0155549 A1 | * | 6/2010 | Robinson | F16M 11/10 248/183.1 |

FOREIGN PATENT DOCUMENTS

CN 104082181 A 10/2014

* cited by examiner

*Primary Examiner* — Todd M Epps

(57) ABSTRACT

The bone or chew toy holder is a device that is adapted to support a chew toy or a pet treat at an elevation that is adapted to be consistent with an applicable pet animal. The bone or chew toy holder is constructed of a base that may be weighted. The base includes a pole that extends vertically from the base. The pole is attached to a spring member that in turn is attached to a bracket. The bracket is used to attach to at least one clamp member. The at least one clamp member is adapted to support a chew toy or pet treat.

8 Claims, 4 Drawing Sheets

BONE OR CHEW TOY HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pet accessories, more specifically, a device adapted to support a chew toy or pet treat.

SUMMARY OF INVENTION

The bone or chew toy holder is a device that is adapted to support a chew toy or a pet treat at an elevation that is adapted to be consistent with an applicable pet animal. The bone or chew toy holder is constructed of a base that may be weighted. The base includes a pole that extends vertically from the base. The pole is attached to a spring member that in turn is attached to a bracket. Optionally, the pole may be telescopic in construction so as to adjust an overall height for varying pet sizes. The bracket is used to attach to at least one clamp member. The at least one clamp member is adapted to support a chew toy or pet treat.

It is an object of the invention to provide a device that is adapted to hold an object at an elevation that is consistent with a pet animal standing such that said pet animal is able to play with, grasp via a mouth, or simply consume the object whilst said animal is standing or sitting.

These together with additional objects, features and advantages of the bone or chew toy holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the bone or chew toy holder in detail, it is to be understood that the bone or chew toy holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bone or chew toy holder.

It is therefore important that the claims be regarded as including such equivalent construction insofar as they do not depart from the spirit and scope of the bone or chew toy holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
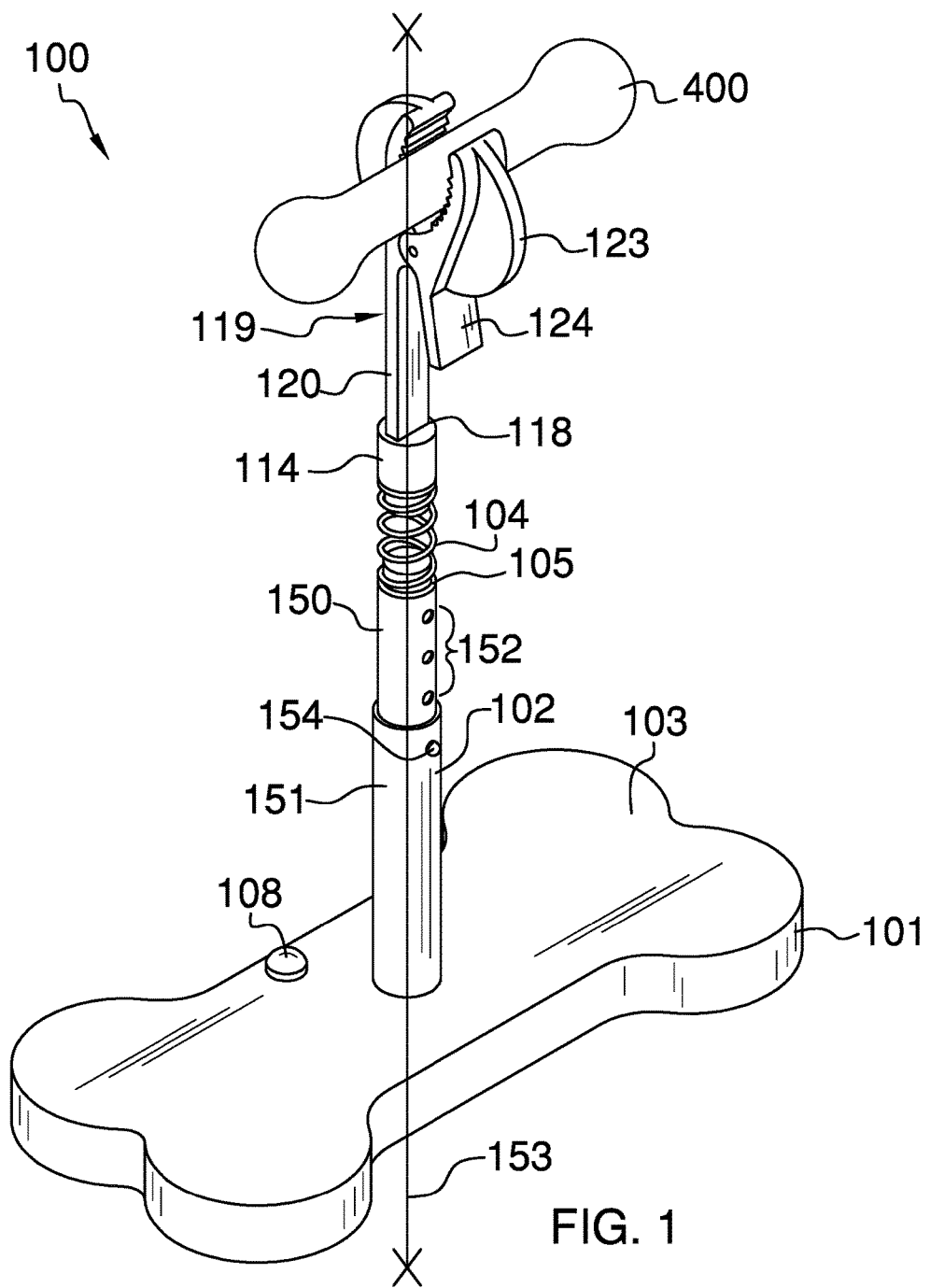
FIG. 1 is a perspective view of an embodiment of the disclosure.
Figure 2:
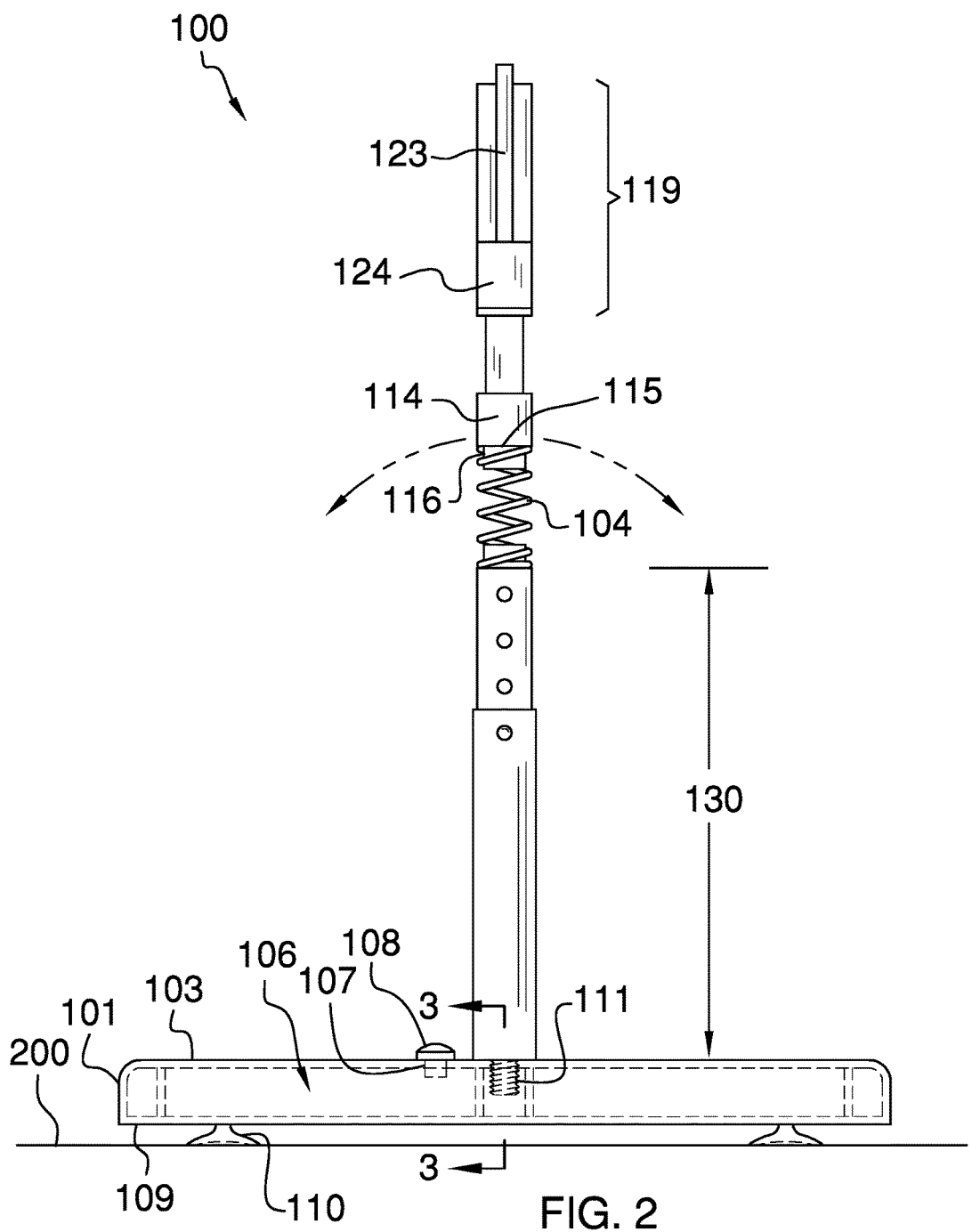
FIG. 2 is a side view of an embodiment of the disclosure.
Figure 3:
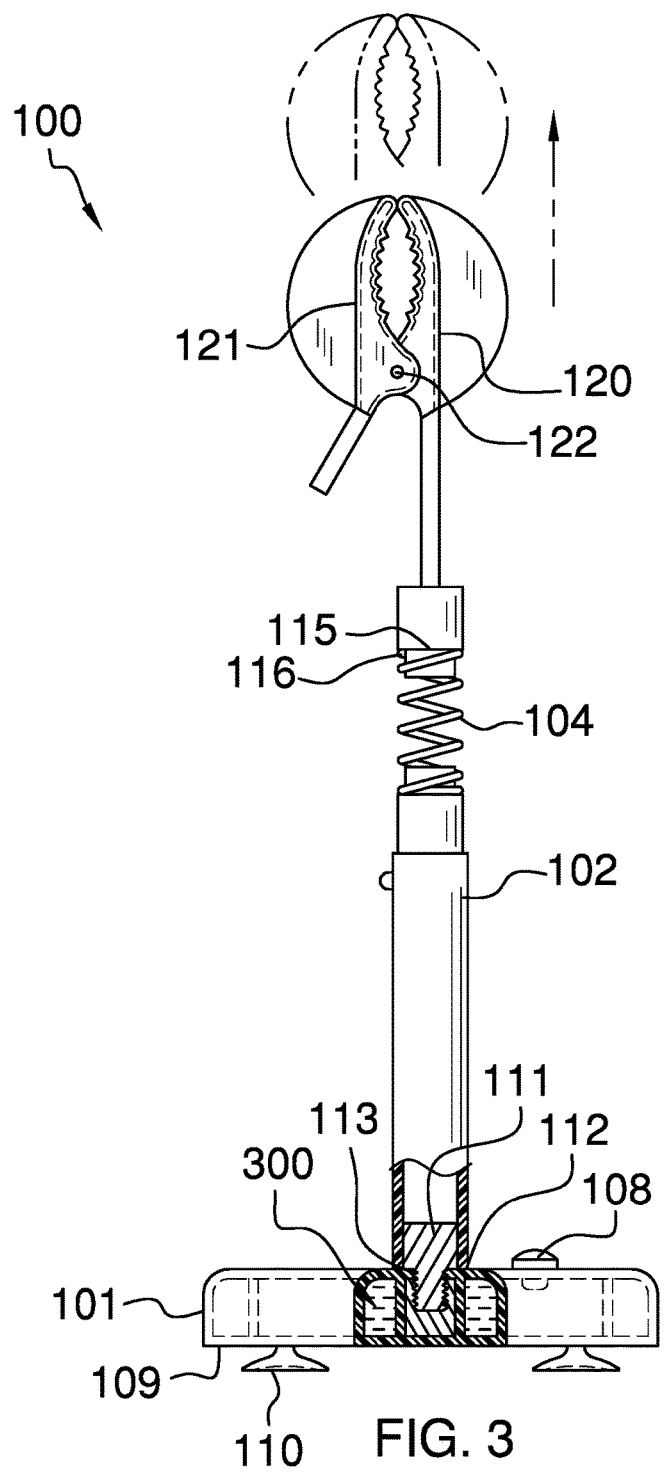
FIG. 3 is a cross-sectional view of an embodiment of the disclosure along line 3-3 in FIG. 2.
Figure 4:
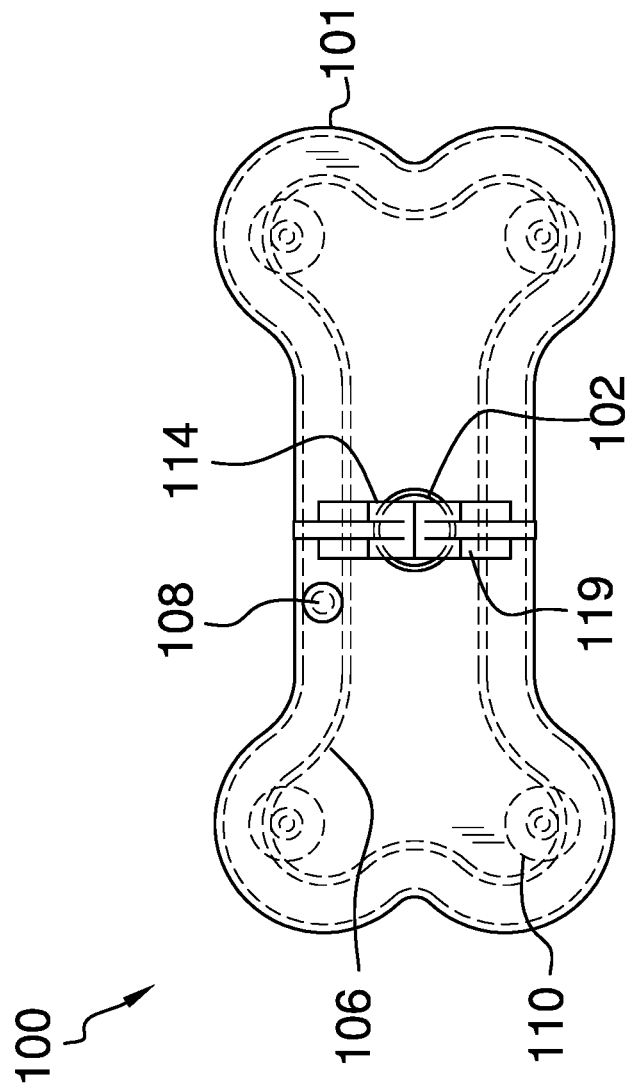
FIG. 4 is a top view of an embodiment of the disclosure.

Detailed reference will now be made to a plurality of potential embodiments of the disclosure, which are illustrated in FIGS. 1 through 4.

The bone or chew toy holder 100 (hereinafter invention) comprises a base 101 that is partially hollow, and may have a shape consistent with a dog bone. Moreover, the base 101 is adapted to interface with a ground surface 200. The base 101 is affixed to a pole 102 that extends vertically from a top base surface 103 of the base 101. The pole 102 is of an undefined length, and is affixed to a spring member 104 at a top pole end 105 of the pole 102.

The base 101 has a hollow cavity 106 located within the base 101. The hollow cavity 106 is accessible via an outlet 107 provided on the top base surface 103 of the base 101. The outlet 107 is sealed via a plug 108. The hollow cavity 106 is fully or partially filled with a weighted material 300, which is ideally water. The base 101 is also further defined with a bottom base surface 109 that is adorned with at least one suction cup 110. The at least one suction cup 110 is adapted to be secured with the ground surface 200.

The pole 102 attaches to the base 101 via a threaded rod 111 provided at a bottom pole end 112. The threaded rod 111 is screwed into a threaded hole 113 provided in the base 101. The threaded hole 113 is provided on the top base surface 103. Moreover, the threaded hole 113 is centrally located on the base 101. The hollow cavity 106 is located aside of the location of the threaded hole 113 of the base 101.

The spring member 104 extends upwardly from the pole 102. The spring member 104 is in turn attached to a bracket 114. The spring member 104 enables the bracket 114 to rotate when the invention 100 is in use. The pole 102 has a pole length 130 that varies depending on the needs of an end user. More specifically, the pole length 130 may vary depending on a pet breed.

The bracket 114 is a cylindrically-shaped object, and which includes a shoulder 115 for receiving a top spring end 116 of the spring member 104. The bracket 114 is further defined with a receptacle 118 for receiving a clamp 119 thereon. The clamp 119 is adapted to support an object 400 thereon. Moreover, the object 400 being further defined as a pet chew toy or pet treat.

The clamp 119 is spring-loaded, and is further defined with a fixed clamp armature 120 that is set into the receptacle 118. A pivoting clamp armature 121 pivots with respect to the fixed clamp armature 120 via a clamp pivot point 122. Both the fixed clamp armature 120 and the pivoting clamp armature 121 are further defined with a hemi-cylindrical protuberance 123 that extends outwardly with respect to the clamp 119. The hemi-cylindrical protuberance 123 of the fixed clamp armature 120 and the pivoting clamp armature 121 form a circular shape, which is highly visible, and prevents an animal from biting the clamp 119 when in use. It shall be noted that the clamp 119 may be made of a host of materials and/or be covered in a host of coatings, which vary depending on the specific needs. The pivoting clamp armature 121 includes an arm 124 that extends upwardly to aid in manipulation of the clamp 119 as needed.

It shall be noted that the clamp 119 is vertically oriented with respect to the bracket 114 and the pole 102. The pole 102 may optionally be telescopic in construction so as to enable adjustment of the pole length 130. The pole 102 may be further defined with a first pole member 150 and a second pole member 151. The first pole member 150 is in a telescopic arrangement with respect to the second pole member 151. Moreover, the first pole member 150 is able to extend and retract from the second pole member 151. The second pole member 151 is affixed to the base 103 in the manner proscribed above.

The first pole member 150 includes a plurality of pole holes 152 that are linearly aligned along a vertical axis 153. The plurality of pole holes 152 enable a spring-loaded button 154 to adjust the pole length 130. The use of the spring-loaded button 154 and the plurality of pole holes 152 is well known in the art.

The base 101, the pole 102, the spring member 104, the bracket 114, and the clamps 119 may be made of a material comprising a metal, wood, plastic, rubber, carbon fiber composite.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A holding apparatus comprising:
a base from which a pole extends to a spring member;
wherein the spring member is attached to a bracket with at least one clamp thereon;
wherein the at least one clamp is adapted to hold an object thereon;
wherein the at least one clamp is adapted to support said object for a pet animal;
wherein the base is partially hollow, and has a shape consistent with a dog bone;
wherein the base is adapted to interface with a ground surface;
wherein the base is affixed to the pole that extends vertically from a top base surface of the base;
wherein the pole is of an undefined length, and is affixed to the spring member at a top pole end of the pole;
wherein the base has a hollow cavity located within the base;
wherein the hollow cavity is accessible via an outlet provided on the top base surface of the base;
wherein the outlet is sealed via a plug;
wherein the hollow cavity is fully or partially filled with a weighted material;
wherein the base is also further defined with a bottom base surface that is adorned with at least one suction cup;
wherein the at least one suction cup is adapted to be secured with the ground surface;
wherein the pole attaches to the base via a threaded rod provided at a bottom pole end;
wherein the threaded rod is screwed into a threaded hole provided in the base;
wherein the threaded hole is provided on the top base surface;
wherein the threaded hole is centrally located on the base;
wherein the hollow cavity is located aside of a location of the threaded hole of the base;
wherein the spring member extends upwardly from the pole;
wherein the spring member is in turn attached to the bracket;
wherein the spring member enables the bracket to rotate back and forth when in use;
wherein the bracket is a cylindrically-shaped object, and which includes a shoulder for receiving a top spring end of the spring member.

2. The holding apparatus according to claim 1 wherein the bracket includes a receptacle for receiving the at least one clamp.

3. The holding apparatus according to claim 2 wherein the at least one clamp is spring-loaded, and is further defined with a fixed clamp armature that is set into the receptacle.

4. The holding apparatus according to claim 3 wherein the at least one clamp is further defined with a pivoting clamp armature that pivots with respect to the fixed clamp armature via a clamp pivot point.

5. The holding apparatus according to claim 4 wherein both the fixed clamp armature and the pivoting clamp armature are further defined with a hemi-cylindrical protuberance that extends outwardly with respect to the at least one clamp; wherein the hemi-cylindrical protuberance of the fixed clamp armature and the pivoting clamp armature form a circular shape, which is highly visible, and is adapted to prevent being bitten when in use.

6. The holding apparatus according to claim 4 wherein the at least one clamp is vertically oriented with respect to the bracket and the pole.

7. The holding apparatus according to claim 6 wherein the pole is telescopic in construction so as to enable adjustment of the pole length; wherein the pole is further defined with a first pole member and a second pole member; wherein the first pole member is in a telescopic arrangement with respect to the second pole member; wherein the first pole member is able to extend and retract from the second pole member; wherein the second pole member is affixed to and extends upwardly with respect to the base.

8. The holding apparatus according to claim 7 wherein the first pole member includes a plurality of pole holes that are linearly aligned along a vertical axis; wherein the plurality of pole holes enable a spring-loaded button to adjust the pole length.

* * * * *